United States Patent
Dutta et al.

(10) Patent No.: US 11,086,871 B2
(45) Date of Patent: *Aug. 10, 2021

(54) DATABASE CONDITIONAL FIELD ACCESS

(71) Applicant: VISA INTERNATIONAL SERVICE ASSOCIATION, San Francisco, CA (US)

(72) Inventors: Ranjan Dutta, Foster City, CA (US); Varun Sharma, Foster City, CA (US); Aman Madaan, Foster City, CA (US); Somashekhar Pammar, San Francisco, CA (US); Zian Huang, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,109

(22) Filed: May 17, 2019

(65) Prior Publication Data

US 2019/0272270 A1   Sep. 5, 2019

Related U.S. Application Data

(63) Continuation of application No. 15/414,145, filed on Jan. 24, 2017, now Pat. No. 10,346,400.

(51) Int. Cl.
  *G06F 16/2453* (2019.01)
  *G06F 16/24* (2019.01)
  *G06Q 30/02* (2012.01)
  *G06F 16/29* (2019.01)

(52) U.S. Cl.
  CPC ........ *G06F 16/24544* (2019.01); *G06F 16/24* (2019.01); *G06F 16/29* (2019.01); *G06Q 30/0238* (2013.01)

(58) Field of Classification Search
  CPC ................. G06F 16/24; G06F 16/2453; G06F 16/24544; G06F 16/29
  USPC ....................................................... 707/714
  See application file for complete search history.

(56) References Cited

U.S. PATENT DOCUMENTS

| | | |
|---|---|---|
| 8,355,926 B1 | 1/2013 | Hinz |
| 8,660,869 B2 | 2/2014 | MacIntyre |
| 2004/0161150 A1 | 8/2004 | Cukierman |
| 2006/0224464 A1 | 10/2006 | Walker |
| 2007/0038620 A1 | 2/2007 | Ka |
| 2007/0162306 A1* | 7/2007 | Peters .................... G06Q 30/06 705/2 |

(Continued)

OTHER PUBLICATIONS

International Search Report and Written Opinion dated May 14, 2018 for PCT/US2018/014247 (11 pgs.).

(Continued)

*Primary Examiner* — Shahid A Alam
(74) *Attorney, Agent, or Firm* — Loeb & Loeb, LLP

(57) ABSTRACT

A database system populates various fields with information from a plurality of data sources which is matched to geographic and segment information for different reference identifiers. A series of data unions provide a selectable result set. A selection of elements from the selectable result set are used to generate qualifiers that are monitored in real time to determine when the qualifiers have been satisfied in order to set a semaphore allowing access to the selection of elements.

15 Claims, 6 Drawing Sheets

(56) References Cited

U.S. PATENT DOCUMENTS

| | | |
|---|---|---|
| 2007/0266015 A1 | 11/2007 | Shakib |
| 2008/0016046 A1 | 1/2008 | Guha |
| 2010/0076979 A1 | 3/2010 | Wang |
| 2011/0191160 A1 | 8/2011 | Blackhurst |
| 2011/0246267 A1 | 10/2011 | Williams |
| 2011/0320230 A1 | 12/2011 | Podgurny |
| 2012/0089432 A1 | 4/2012 | Podgurny |
| 2012/0089493 A1* | 4/2012 | Podgurny .............. G06Q 10/06 705/32 |
| 2012/0215639 A1* | 8/2012 | Ramer ................ G06F 16/9535 705/14.53 |
| 2014/0095258 A1 | 4/2014 | Weiss |
| 2014/0164124 A1 | 6/2014 | Rhoads |
| 2017/0352051 A1 | 12/2017 | Watkins |

OTHER PUBLICATIONS

Uber Offers get merchants to pay for your ride, TechCrunch, posted date May 3, 2016, by Josh Constine (@joshconstine). Available from the Internet, <https://techcrunch.com/2016/05/03/uber/offers/>, 7 pages.

Notice of Allowance dated Feb. 21, 2019 for U.S. Appl. No. 15/414,145 (pp. 1-8).

Office Action dated Oct. 10, 2018 for U.S. Appl. No. 15/414,145 (pp. 1-17).

* cited by examiner

160 ─

| Segment | Offers | Item | Item description | Merchant/Data Source | Value |
|---|---|---|---|---|---|
| 1 | Region 1, 2 | Item 1 | Amazon.com gift card | Merchant 1 | $25 |
| 2 | Region 3 | Item 2 | $10 off Uber ride | Merchant 3 | $10 |
| 1 | Region 1 | Item 3 | Target gift card | Merchant 2 | $20 |
| 2 | Region 2 | Item 4 | $30 groceries at Target | Merchant 2 | $30 |
| 3 | Region 2 | Item 5 | Target gift card | Merchant 2 | $30 |
| 4 | Region 5 | Item 6 | 4 months Amazon Prime | Merchant 1 | $35 |
| 1 | Region 3 | Item 7 | Petsmart gift card | Merchant 4 | $20 |

| Segment | Customers | Ref ID (PAN) |
|---|---|---|
| 1 | Region 1 | 123 |
| 2 | Region 2 | 123 |
| 4 | Region 2 | 123 |
| 2 | Region 2 | 234 |
| 1 | Region 1 | 345 |
| 2 | Region 2 | 345 |

FIG. 4

Offers by PAN(i) segment — 164

| | | | |
|---|---|---|---|
| 1 | Item 1 | Amazon.com gift card | Merchant 1 | $25 |
| 2 | Item 2 | $10 off Uber ride | Merchant 3 | $10 |
| 1 | Item 3 | Target gift card | Merchant 2 | $20 |
| 2 | Item 4 | $30 groceries at Target | Merchant 2 | $30 |
| 4 | Item 6 | 4 months Amazon Prime | Merchant 1 | $35 |
| 1 | Item 7 | Petsmart gift card | Merchant 2 | $22 |

FIG. 5

Offers by PAN(i) geocode — 166

| | | | |
|---|---|---|---|
| Region 1 | Item 1 | Amazon.com gift card | Merchant 1 | $25 |
| Region 2 | Item 1 | Amazon.com gift card | Merchant 1 | $25 |
| Region 1 | Item 3 | Target gift card | Merchant 2 | $20 |
| Region 2 | Item 4 | $30 groceries at Target | Merchant 2 | $30 |
| Region 2 | Item 5 | Target gift card | Merchant 2 | $30 |

FIG. 6

Selectable offer set — 168

PAN(i) by segment (PS) and Geocode (PZ)

| | | | | |
|---|---|---|---|---|
| 1 | Region 1,2 | Item 1 | Amazon.com gift card | Merchant 1 | $25 |
| 1 | Region 1 | Item 3 | Target gift card | Merchant 2 | $20 |
| 2 | Region 2 | Item 4 | $30 groceries at Target | Merchant 2 | $30 |

Selection (The Basket)

| | Basket value | | Item 1 | Amazon.com gift card | Merchant 1 | $25 |
|---|---|---|---|---|---|---|
| | | $55 | Item 4 | $30 groceries at Target | Merchant 2 | $30 |

Task fields | Tasks | | | |
---|---|---|---|---
| Assigned/completed | Geocode | Task | Merchant/Task source | Value |
| 1/0 | Region 1 | Task 1 | Spend $20 at Amazon.com | Merchant 1 | $20 |
| 1/1 | Region 1 | Task 2 | Spend $10 at Target | Merchant 2 | $10 |
| 0/0 | Region 2 | Task 3 | Spend $20 at Gap | Merchant 5 | $20 |
| 0/0 | Region 3 | Task 4 | Spend $12 at Petsmart | Merchant 4 | $12 |
| 1/1 | Region 2 | Task 5 | Spend $7 at Uber | Merchant 3 | $7 |
| 1/0 | Region 2 | Task 6 | Spend $6 at Amazon.com | Merchant 1 | $6 |
| | | | | Assigned Task Value | $43 |
| Semphore | | | | | |

FIG. 9

DATABASE CONDITIONAL FIELD ACCESS

This is a continuation application of U.S. nonprovisional application Ser. No. 15/414,145, filed on Jan. 24, 2017, whose disclosure is incorporated by reference in its entirety herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Databases are used to control access to certain fields. However, most conditional access is determined by the database designer or rules of the system, particularly when used to determine promotional awards. For example, database fields that specify discounts on items are defined at design time. If such a database specifies an item that is not of interest to a user or is something the user doesn't need at the time, the user may not be motivated to participate even if there is a significant advantage offered.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A server and user interface monitors consumer behavior to update database fields that specify conditions related to an award. The system also monitors behavior in real time to determine when a set of conditions exist that cause the server to selectively provide access to previously inaccessible code or database fields. In some embodiments, the consumer may participate in the selecting the behaviors that are monitored.

BRIEF DESCRIPTION OF THE DRAWINGS

FIGS. 3-9 are illustrations of exemplary database records and fields in accordance with the current disclosure.

Figure 1:
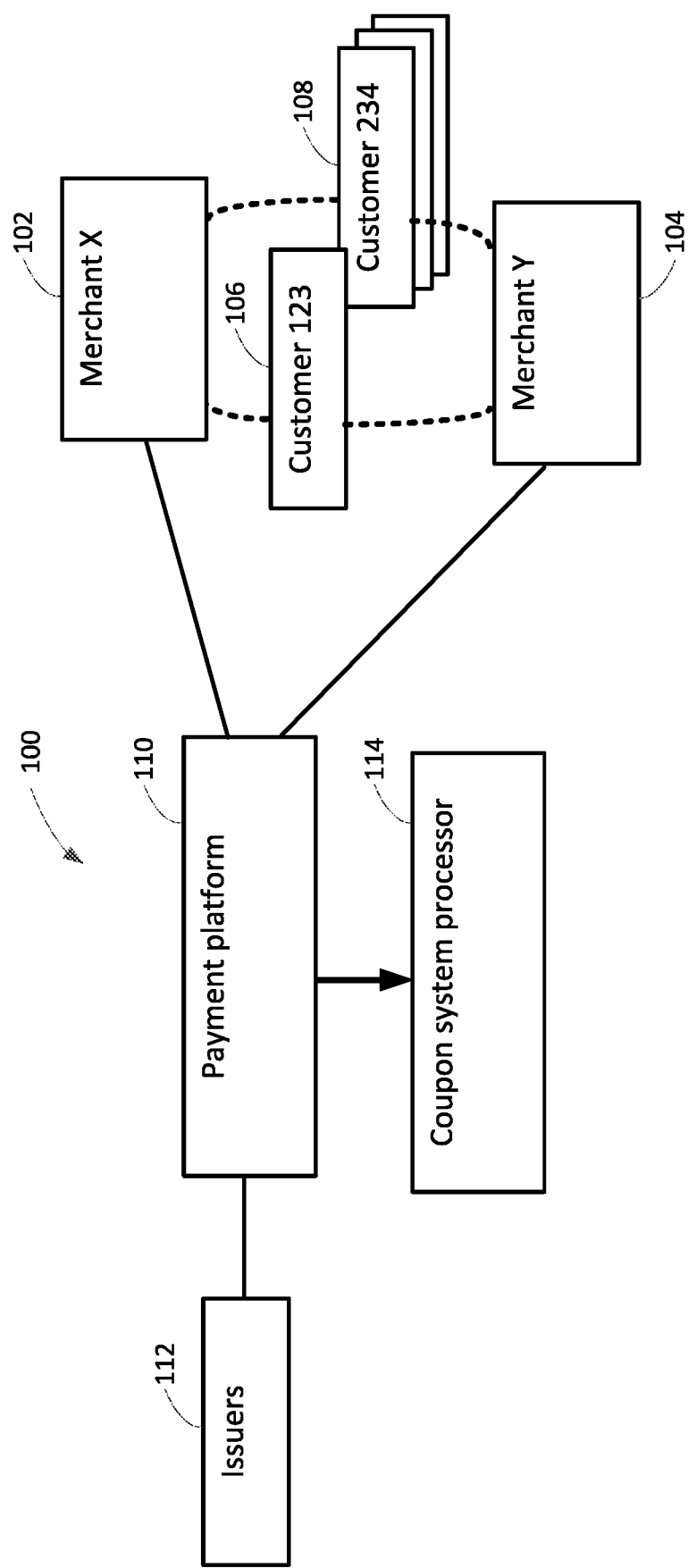
FIG. 1 illustrates a block diagram of system elements in accordance with the current disclosure.

The figures depict various embodiments for purposes of illustration only. One skilled in the art may readily recognize from the following discussion that alternative embodiments of the structures and methods illustrated herein may be employed without departing from the principles described herein.

DETAILED DESCRIPTION

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

Merchants are generally considered to be a vendor that provides products for sale while a service provider offers services such as transportation or banking. In the following disclosure, the terms merchant and service provider are used interchangeably and the use of one or the other term is not limiting in terms of the disclosure.

When a customer receives a "buy one, get one free" offer, it can fail to generate loyalty or extra business for a merchant for any of several reasons. These may include, the customer doesn't use that kind of merchandise or service, the customer doesn't have occasion to be in the geographic area of the merchant or service provider, or the customer doesn't need two of that item and is actually discouraged from buying one if the second one isn't needed or wanted. When the offer is made by a merchant to an existing customer, by definition, such an offer does not allow the merchant to reach beyond its current customer base. A marketplace for coupons takes advantage information developed by a payment platform using detailed transaction history for customers by location and item segment to heuristically design offers and qualifiers that are both likely to appeal to a customer and be in the customer's shopping area. Further, an offer can be tailored to a customer who may have not previously interacted with the merchant sponsoring the offer. Because, in an embodiment, the customer must meet certain requirements in the form of performing qualifying tasks before the offer is available, the shopping habits of the customer can be encouraged to expand beyond previously used merchants or service providers.

Turning to FIG. 1, a block diagram of a system 100 in accordance with the current disclosure is discussed and described. The system 100 includes a merchant X 102 and a merchant Y 104. A customer 106 with a personal account number (PAN) 123 and a customer 108 with a PAN 234 are illustrated interacting with both merchants 102, 104 independently. Each of the merchants 102, 104 are in communication with a payment platform 110 that processes payments for each of the merchants 102, 104 by performing approval-related tasks such as de-tokenizing payment instruments and routing payment requests to one or more issuers 112. The payment platform 110 may also receive payment approvals from the one or more issuers 112 and return authorization messages to the merchants 102, 104 to allow a particular transaction to be completed. The payment platform 110 may also interact with a coupon system processor 114 that is configured to develop and monitor offers and tasks related to customer activity.

The customer 106 interactions with the merchants 102, 104 may include in-store purchases, online purchases, or even website interactions that get logged and passed to the payment platform 110, for example, in the form of loyalty point awards that are processed similarly to other financial transactions. In various embodiments, the customer 106 may be required to register each PAN that is to participate in the coupon system while in other cases, enrollment may be automatic or opt-out only.

In an embodiment, the payment platform 110 may pass transaction information for all PANs to the coupon system processor 114. In other embodiments, the payment platform 110 may only pass transaction information for certain PANs based either on a registration status of the customer, the PAN being associated with a particular issuer 112, or the merchant itself. That is, in some embodiments, all transactions for a certain merchant or set of merchants may be monitored, while in other embodiments, only certain PANs may be monitored. In other embodiments, other rules may be developed for specifying which transactions are passed to the coupon system processor 114.

Figure 2:
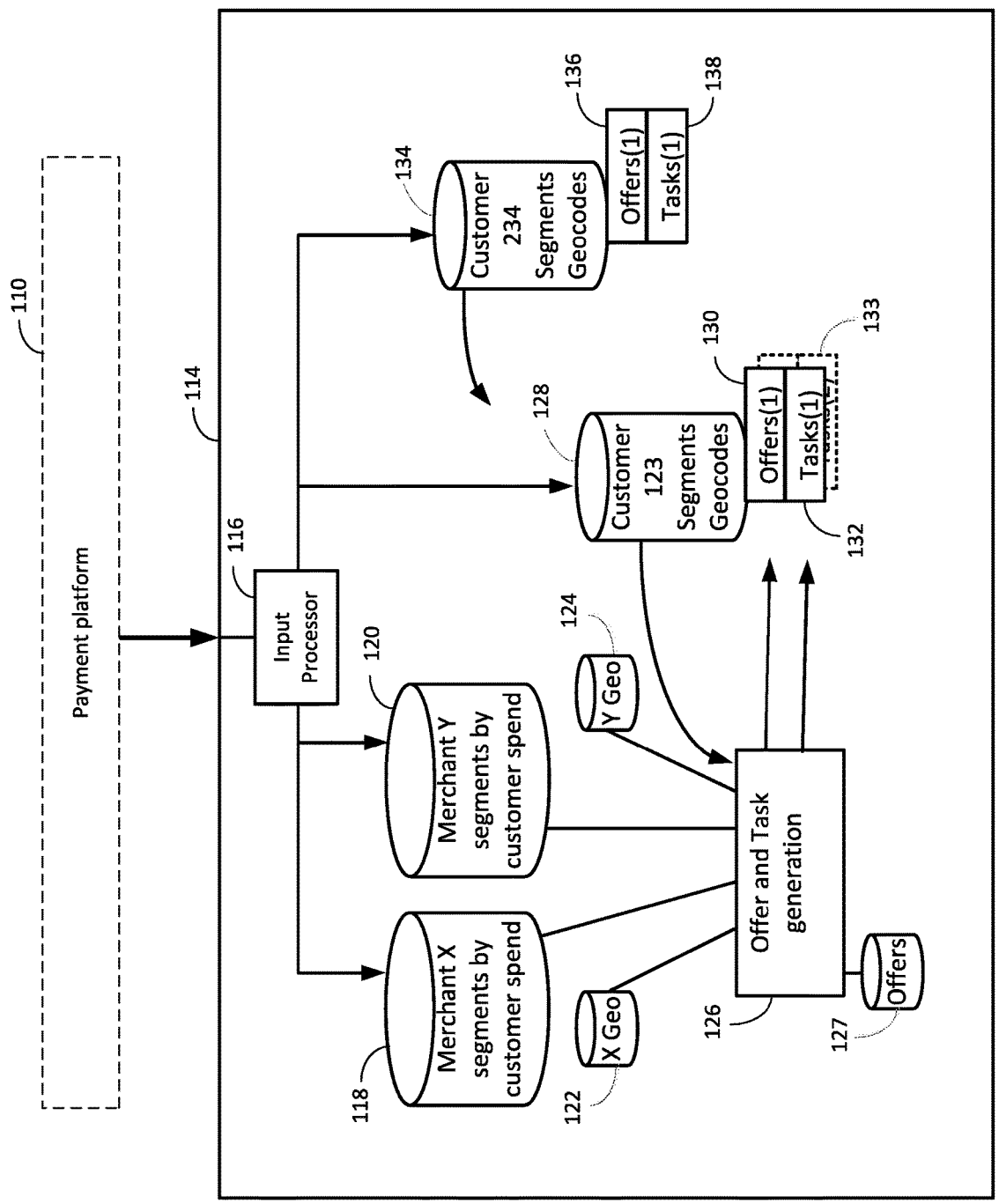
FIG. 2 is a block diagram illustrating a functional view of a coupon system processor.

An exemplary functional block diagram of the coupon system processor 114 is illustrated in FIG. 2. Data from the payment platform 110 may be received at an input processor 116. The input processor 116 may determine the nature of a transaction and the relevant parties, e.g., merchant X 102 and customer 106, as well as to extract data from the transaction that can be used to improve characterizations of both the merchant and customer. In an embodiment, the input processor 114 may apply heuristics to associate a particular transaction with a market segment and a location. For example, a transaction at merchant X 102 made in Hawaii by a customer 106 that resides in San Francisco may be coupled with other data about the customer 106 to infer that they are "globe trotters." The nature of the purchase, for example, a shockproof, waterproof watch, may be used to infer they are part of a segment of "outdoor recreation." In addition, a geocode or geographic region, for the customer may be added to their residence location to include Hawaii, or even other popular travel destinations.

The merchant X 102 may also have its data updated, or at least the data for a particular store location, to include a customer segment of "outdoor recreation." There is virtually no limit on the number of segments that may be developed to characterize both customers and merchants by the type of products purchased and services transacted. In other embodiments, some segments may be noted as excluded for a particular customer 106. Some categories may be automatically assigned unless specifically excluded. Just for the sake of example, if over a period of time the customer 106 never purchases gas, oil, or auto repairs, the customer may be removed from an automatically-assigned segment of "auto owner." This may also correspond to assignment to a segment of "ride share" when the customer routinely uses a ride sharing service.

As segment and geocode information are added to respective customer databases 128 and 134, profiles of the customers 106, 108 may be more accurately tuned for product types (segments) and geographic regions (geocodes) in which the customer is likely to complete transactions. Similarly, the coupon system processor 114 may refine its segment and spend information at merchant X data store 118 and merchant y 120 data store. Additionally, either via transaction data or simple direct downloads, merchant X geographic data 122 and merchant Y geographic data 124 may be added include store locations and/or service boundaries for use in the processes described below.

In an embodiment, a customer 106 may be presented with a selection of offers developed for the user by an offer and task generation module 126. The offers may represent discounts on purchases, discounts on services, free merchandise or services, or cash back on purchases, among other incentives.

The offers presented to a customer 106 may be selected from a set of all offers 127 made available by all merchants. In another embodiment, offers may be generated using parameters provided by merchants. In general, the offers may be selected by the offer and task generation module 126 so that customers, for example by PAN, are matched by segment and geography to merchant offers having matching geography and segment characteristics. In other embodiments, offers may be selected for a user by observing past behavior from connected devices with which the customer 106 may interact. The goal being to provide the customer with a choice of offers that are likely to appeal to the customer both as something they might use and be in a geographic area where they are likely to be. More formally, the offers may be matched to PANs using the following exemplary algorithm:

---

Given:
P : Set of all the PANs.
O : Set of all the Offers.
S : Set of Segment identifiers.
Z : Set of Geo Location identifiers.
$p_i$: The Given PAN for which offers have to be calculated.
Mapping PS: $p \rightarrow \{S1; S2; ..., S_p\}$ where $p \in P$
Mapping PZ : $p \rightarrow \{Z1; Z2; ..., S_q\}$ where $p \in P$
Mapping OS : $o \rightarrow \{S1; S2; ..., S_r\}$ where $o \in O$
Mapping OZ: $o \rightarrow \{Z1; Z2; ..., Z_t\}$ where $o \in O$
For a given PAN, pi, find the set of relevant offers $O_i$.
$S_i = PS(p_i)$ being all the segments for PAN pi obtained from PS (defined above)
$O_{si} = \{o:OS(o) \cap S_i \neq 0\}$ being offers based on $p_i$'s segments
$Z_i = PZ(p_i)$
$O_{zi} = \{o:OZ(o) \cap Z_i \neq 0\}$ being offers based on $p_i$'s geo location identifiers
Set of relevant offers $O_i$ is $O_i = O_{zi} \cap O_{si}$

---

The customer 106 may view the list of presented offers and select one or more for addition to the customer's "basket." The basket is a collection of all offers selected by the customer 106 for which corresponding tasks or qualifiers are matched. A value of basket is a total of value the individual offers in the basket. The qualifiers may be selected from a predetermined list of tasks or the tasks may be generated by the offer and task generation module 126 based on additional parameters and a generation algorithm.

A task may be similar in form to an offer in that it specifies a merchant product or service and specifies a value but instead of offering that value to the customer 106, the customer is required to purchase the product or service at a level at or above the specified value. That is, the task, or set of tasks, must be completed before the customer 106 is qualified to receive the value in the basket. However, unlike the traditional buy one, get one free promotion, the tasks are not necessarily tied to the merchant providing the offer that the customer has selected for the basket. Neither is there necessarily a one-to-one correlation of tasks to offers. In an exemplary embodiment, a bundle of tasks is selected to have an overall value less than the value of the basket, so that the customer 106 is motivated to complete the tasks in order to receive the higher value benefit provided by the offer or offers in the basket.

The level of value difference between the basket and the tasks may be selected programmatically or may be based on a merchant's desire to promote the product or service of the offer. Because, in one instance, the sources of offers may have been satisfied to provide the offer without compensatory tasks, the merchants may be ambivalent to the actual value of the tasks. In yet another embodiment, the selection of tasks may be such that those merchants that provide more offers are also those that receive more tasks, thus offsetting the cost of the offer. Because the tasks are selected from a variety of merchants and service providers, the system 100 provides, among other benefits, the ability to motivate a customer 106 to use a merchant outside the customer's previous experience. For example, in order to receive the benefit of an offer which may or may not be from a merchant with whom the customer does have experience, the customer may be required to interact with a new-to-them merchant.

In an embodiment, the task selection process may include, similar to offer selection, a comparison of both segment and geographic regions for the customer 106 so that the tasks are likely to be of interest to the customer 106. However, there is no requirement that the tasks are selected from the same segment or even the same geographic region as the offer, only that the tasks are selected from the segments and geographic areas in the database 128 of the customer 106. After tasks have been pre-selected by geographic region and segment, the task list may be developed to follow a set of guidelines that includes preferential assignment of tasks according to their participation in the process as well as setting a limit for the value of the tasks compared to the value of the basket. The following is one exemplary algorithm for developing tasks related to particular offers.

Given:
$p_i$ : The PAN for which tasks have to be developed.
$O_{i,selected}$ : Offers Selected by PAN $p_i$.
$B_w$ : The total $ value (or the weight) of $O_{i,selected}$.
M : Set of Merchants in the Marketplace.
$M_{i,c}$ : Contribution by Merchant i to the Market (in $).
$M_{i,p}$ : Probability that PAN $p_i$ will transact at Merchant i.
$max_{weight} = 0$
$min_{weight} = INF$
for m ∈ M do
$M_{m,weight} = M_{m,p} + M_{m,c}$
$max_{weight} = max(max_{weight}, M_{m,weight})$
$min_{weight} = min(min_{weight}, M_{m,weight})$ -continued end for
/Create a distribution of the merchants weighted by the potential of the customer 106 to transact, as well as by the merchant contribution
merchantDistribution = { }
for m ∈ M do $$merchantDistribution.append\left(\frac{Mm, weight - minweight}{maxweight}\right)$$

/All the weights are now between 0 and 1
end for
taskTotalWeight = 0
taskList =
while taskTotalWeight ≤0.8*$B_w$ do
M ← sampleWithoutReplacement(merchantDistribution)
/Sample Without Replacement: Each Merchant should be picked once
possibleTaskWeights = [$M_{ticketSize}$ * 0.10, $M_{ticketSize}$ * 0.15, $M_{ticketSize}$ *0.25]
i = argmin$_i$ Abs(taskTotalWeight + possibleTaskWeights$_i$ − 0.8*Bw)
pickedMerchantTaskWeight = possibleTaskWeights$_i$
if taskTotalWeight + pickedMerchantTaskWeight > 0.8*Bw then
pickedMerchantTaskWeight = 0.8*Bw − taskTotalWeight /Cannot exceed the basket limit
end if
taskList:append((M, pickedMerchantTaskWeight))
taskTotalWeight+ = pickedMerchantTaskWeight
end while Selected offers 130 for PAN 123 and selected offers 136 for PAN 234 are shown in FIG. 2 in the customer databases 128 and 134, respectively. Similarly, the corresponding tasks 132 and 138 are stored with the customer databases 128 and 134 after being generated by the offer and task generation module 126. In an embodiment, a customer 106 may have more than one offer/task set pending at a time, as illustrated by offer/task set 133. Some recognition of peer groups may be used to ensure that offers and tasks do not cannibalize each other. For example, a task may be passed over for assignment if it requires purchase of a competitive product from another merchant for which the current offer is outstanding.

Following the selection by the customer 106 of one or more offers 130 and the assignment of tasks 132 for the selected offer or offers, the payment platform may continue to relay transaction data to the coupon system processor 114. The input processor 116 may route transactions for a specific PAN 123 (i.e. corresponding to customer 106) to its respective database 128. The transaction details are evaluated to determine whether they match any of the pending tasks 132. If so, then that particular task is marked as completed. If additional tasks are not completed, the process continues until either the remaining tasks are completed or another event passes, such as an expiration of the offer. In an embodiment, a smart watch or other smart device may notify the customer 106 when the customer is in the vicinity of a merchant or service provider for which there is an associated task.

FIG. 3 may illustrate first database fields 160 with items representing the set of all offers 127. The first database fields may include information about a source of the item (e.g., the merchant or service provider), a description of the item, a geographic reference, and a segment designation. As discussed above, the geographic reference may reflect one or more locations of the merchant or a service area where the merchant operates. The segment may describe a characteristic of the item with respect to the segment of customer that would purchase such an item (or service). Also shown is a value of the offer. For example, the value of a gift card may simply be the face value of the gift card while a subscription to a service may be the retail value of the service.

FIG. 4 may illustrate second database fields 162 representing a collection of customers identified by a reference identifier, in this embodiment a PAN, as well as geographic regions where that customer has a history of shopping and segment information identifying general interests or shopping patterns.

A first item set 164 developed from a union of the first database fields 160 and the second database fields 162 over segment data is shown in FIG. 5. The result illustrated shows offers (items) from various merchants that match the segment for a particular PAN. FIG. 6 illustrates a second item set 166 resulting from a union of the first and second database fields 160, 162 over geographic regions.

A first database record 168 is shown in FIG. 7. The first database record 168 contains selectable items resulting from a union of the first item set 164 and the second item set 166. That is, the result of filtering all offers from all merchants by the segment and geographic region characteristics of a particular PAN 123. These are the offers that are presented to a customer 106 from which a selection may be made. The selection 170 may be represented in FIG. 8 and the corresponding data stored with the customer offers 130. The selection 170 are the offers, that is, the basket, which the customer 106 has selected based on his or her preference and for which he or she is willing to complete tasks to be assigned.

FIG. 9 may illustrate a list of tasks or qualifiers 172 from which tasks 132 may be selected for the customer 106 according to the selections shown in FIG. 8. The qualifiers in this exemplary figure may be predetermined, for example, as provided by individual merchants 102, 104. In other embodiments, the qualifiers may generated in real time based on rules or guidelines for different merchants. The qualifiers may be selected using the technique illustrated above so that the selection includes merchants according to their level of participation in the program and also so that the value of the qualifiers is a given percentage less than the value of the basket. In this illustration, the value of the basket is $55 while the value of the tasks or qualifiers is $43 or less than 80% of the basket value. While the algorithm above uses an 80% task to basket value, this percentage may be changed according to the desires of the system designer based on the goals of a particular incentive campaign.

Also shown in FIG. 9 is one method of tracking completion of tasks by the customer 106. The tasks selected are shown with a "1" in the first position of the "assigned/completed" column and the current state of completion is reflected in the second position of that column. As shown, task 1 is assigned but not completed, task 2 is assigned and completed, while task 3 is not assigned, presumably because the high value of task 3 would have caused the total task value to exceed the value limit during the selection process.

A semaphore, or other indicator, may be using to indicate when the tasks have been completed and the offers in the basket may be associated or released to the PAN and its associated user. Fulfillment or delivery of the offer after completion of the tasks may be proactive, such as sending a gift card to the customer 106 or may be reactive, in the form of a rebate or statement credit after the subject of the offer has been purchased by the customer 106. This latter option may be facilitated by the ability of the payment platform 110 to monitor customer transactions over multiple merchants 102, 104 with multiple issuers 112, that is, by the payment platform's view across a wide spectrum of transactions.

Figure 10:
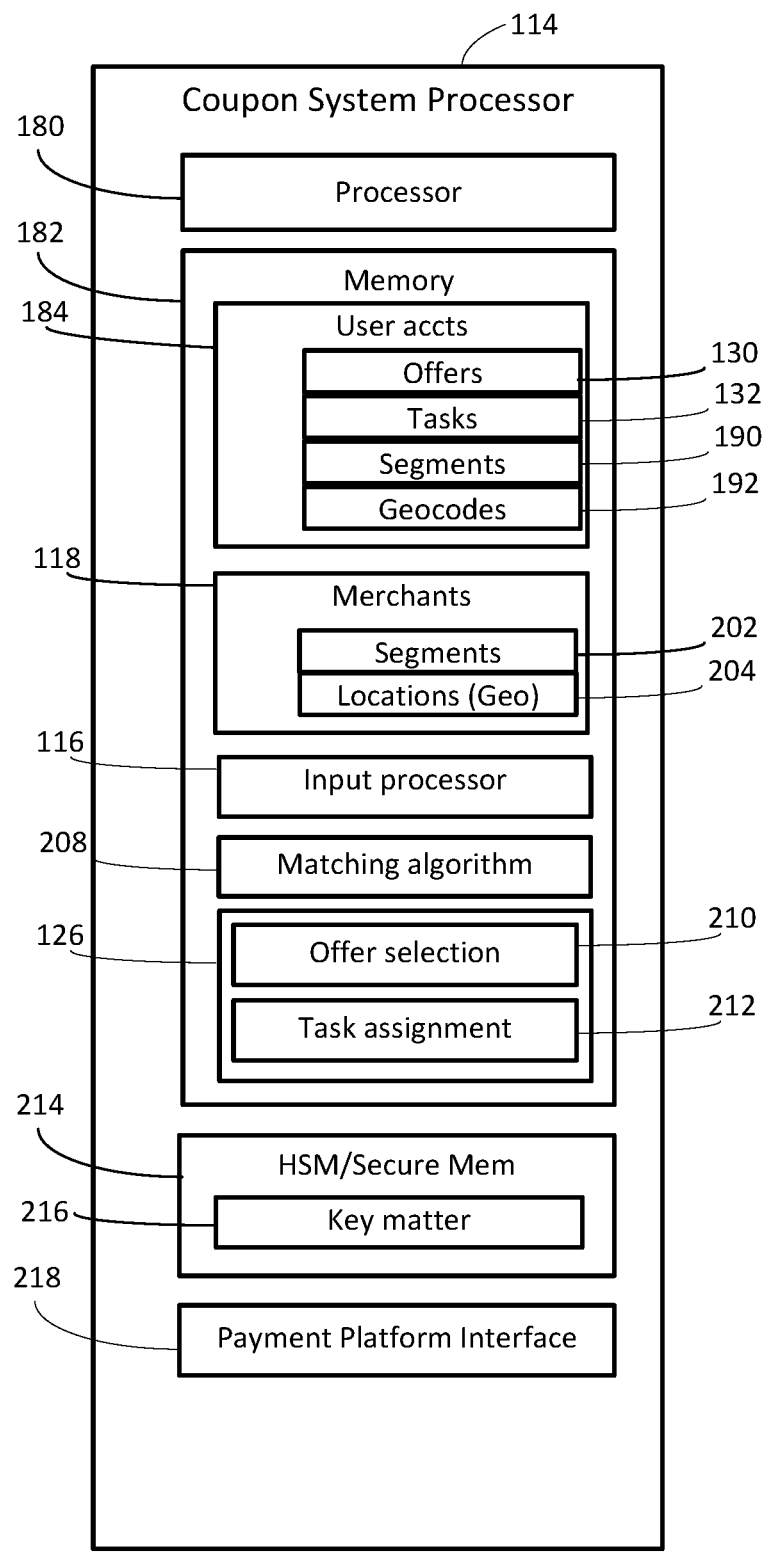
FIG. 10 is a block diagram illustrating a hardware view of the coupon system processor.

FIG. 10 may illustrate a hardware block diagram of the coupon system processor 114. The coupon system processor 114 may include a processor 180 and a memory 182. The memory 182 may include user accounts 184, such as customer data 128 and customer data 134 of FIG. 2. These user accounts may have offer data 130 and task data 132 as well as customer segment information 190 and geographic region data 192 related to areas where a customer may have or be likely to shop. Merchant X data 118 may include product segment information 202 as well as geographic location information 204 related to the merchant footprint. The input processor 116 may be used to determine whether a specific transaction is of interest and then where to route transaction data. For example, a transaction involving merchant X 102 and PAN 123 may be routed to both the merchant X data 118 and the customer data 128, while a transaction involving merchant X 102 and a PAN 789 may only be routed to the merchant X 102 for segment development if, for example, PAN 789 has opted out of the program.

The matching algorithm 208 may be used to determine whether or not a transaction satisfies a task requirement for a particular offer. The offer and task generation module 126 may include separate sub-modules 210 and 212 for offer selection and task assignment, respectively, as discussed above. In various embodiments, an HSM 214 may include a secure memory and may be used to store key matter 216 as required for secure communication and data protection. A payment platform interface 218 may support communication with the payment platform 110. Because of the amount of data that may be passed between these functions, the bandwidth of the connection may be higher than a typical business data pipe.

In an aspect of the disclosure a database system comprises first database fields each including, respectively, an item, an item description, a first geographic reference, a source of the item, and a first segment designation, second database fields including, respectively, a reference identifier, a second geographic reference, and a second segment designation, a first item set derived from a union of first segment designations by the item and the second segment designation of the reference identifier, and a second item set derived from a union of the first geographic references and the second geographic designation. The aspect may also include a selectable item set derived from a union of the first item set and the second item set, a selection record resulting from a selection of one of the items from the selectable item set, the selection record further populated with at least one qualifier, the at least one qualifier generated based on the selection and a fourth database field populated with activity records for the reference identifier and may also include a monitor that matches activity records for the reference identifier with the at least one qualifier.

In another aspect of the disclosure, a method of providing access to a database field based on selective actions includes accessing a database that includes selectable items and presenting one or more selectable items via a user interface, receiving, via the user interface, a selection of one or more of the selectable items in the database made by a consumer and storing the consumer's selection in the database. The method may also include identifying a database field corresponding to an award selected by the consumer, identifying the consumer using a personally identifiable indicia, providing behavior-related information about the consumer to an algorithm and using the algorithm, selecting a plurality of tasks based on the behavior-related information and the selection. The method further may include storing the plurality of tasks in the database, receiving a confirmation of a behavior of the consumer, matching the behavior of the consumer to one of the plurality of tasks stored in the database, and providing the consumer access to the selection in the database when a minimum number of the plurality of tasks has been matched to a corresponding behavior of the consumer.

In a third aspect of the disclosure, a method may include assigning a customer to a customer segment by past purchase history, identifying a customer geographical region by location history, creating merchant segments by customer spend for a plurality of merchants, identifying store locations by customer spend for each of the plurality of merchants and receiving a set of all offers by merchant and location for at least one of the plurality of merchants. This aspect may also include mapping the customer segment to corresponding merchant segment to create a first offer segment, mapping the customer geographical region by store location to create a second offer segment, presenting, to the customer, a subset of all offers, the subset of all offers generated by a union of the first offer segment and the second offer segment and receiving, from the customer via a user interface, a selection of a basket set of selected offers, each offer in the basket set of selected offers chosen by the customer from the subset of all offers resulting from a union of the first offer segment and the second offer segment. The method disclosed herein may include weighting the basket set of offers based on a total value of the selected offers, selecting tasks to be accomplished by the customer at various merchants, the tasks and associated merchants selected as a function of a contribution of a merchant to the set of all offers and a weighted potential for the customer to transact at the merchants, presenting the selected tasks to the customer and recording customer transactions where the customer transaction is matched to a corresponding task. The method may conclude by matching a customer transaction to a corresponding task, identifying when all of the selected tasks have been accomplished, and providing the customer with access to offers in the basket set of selected offers when all of the selected tasks have been accomplished.

The disclosed system and method solve the technical problem of aggregating and processing high volumes of data so that the no single element of the hardware is overloaded. The database structures incorporate segregation of data that provides both data security for merchants and customers but also permits sharing of the data on an as-needed basis. The ability to parse and evaluate transaction data in real time benefits both merchants and customers as previously unavailable access is provided between entities which have not previously interacted.

The invention claimed is:

1. A computer-implemented method comprising:
populating first database fields of a first database structure with items for storage in the first database, the items being received from a plurality of data sources and corresponding to offers;
populating second database fields with reference identifiers, each reference identifier including a location identifier and a segment identifier based on previous data stored in the first database structure pertaining to the reference identifier, wherein each reference identifier corresponds to an identification of a consumer;
creating a first item set from a union of the first and second database fields in a second data structure that match a segment identifier of a reference identifier with one of the items;
creating a second item set from a union of the first and second database fields in a third data structure that match an item location reference with a reference identifier location identifier;
performing a union operation of the first item set and the second item set resulting in selectable items being a portion of the offers stored in the second database structure, said each of the fields in the second database structure having a pre-determined access control;
receiving, via a user interface, a selection of one or more of the selectable items from a first database record;
generating at least one qualifier based on the selection and a probability of interaction between the plurality of data sources and an entity associated with the reference identifier, wherein the at least one qualifier corresponds to a task to be completed by the consumer to receive the portion of the offers based on the selection;
monitoring, by a payment platform, updates of the first database fields in real time associated with the reference identifier to determine when one of the updates matches the at least one qualifier, wherein the one of the updates comprises a transaction completed by the consumer; and
responsive to determining, by the payment platform, when the one of the updates matches the at least one qualifier, setting a semaphore that associates the selection of the one or more selectable items with the reference identifier, wherein the semaphore provides the entity to redeem the selection of the one or more selectable items, wherein the semaphore alters the pre-determined access control of the fields and is configured for monitoring, by the payment platform, customer transactions over multiple merchants with multiple issuers.

2. The method of claim 1, wherein generating the at least one qualifier further comprises matching a segment of the qualifier and the segment of the reference identifier.

3. The method of claim 2, wherein each of the item comprises a segment designation, and wherein the segment designation of the item and the segment identifier of the reference identifier correspond to a property common to a group of reference identifiers.

4. The method of claim 1, wherein generating the at least one qualifier further comprises selecting the at least one qualifier to have a total value less than a value of the selection of one or more of the selectable items.

5. The method of claim 1, further comprising storing all activity associated with the reference identifier into the second database fields that is monitored to determine when one of the updates matches the at least one qualifier.

6. A non-transitory computer readable medium stored thereon computer-executable instructions for database conditional field access, said computer-executable instructions comprising:
populating first database fields of a first database structure with items for storage in the first database, the items being received from a plurality of data sources and corresponding to offers;
populating second database fields with reference identifiers, each reference identifier including a location identifier and a segment identifier based on previous data stored in the first database structure pertaining to the reference identifier, wherein each reference identifier corresponds to an identification of a consumer;

creating a first item set from a union of the first and second database fields in a second data structure that match a segment identifier of a reference identifier with one of the items;

creating a second item set from a union of the first and second database fields in a third data structure that match an item location reference with a reference identifier location identifier;

performing a union operation of the first item set and the second item set resulting in selectable items being a portion of the offers stored in the second database structure, said each of the fields in the second database structure having a pre-determined access control;

receiving, via a user interface, a selection of one or more of the selectable items from a first database record;

generating at least one qualifier based on the selection and a probability of interaction between the plurality of data sources and an entity associated with the reference identifier, wherein the at least one qualifier corresponds to a task to be completed by the consumer to receive the portion of the offers based on the selection;

monitoring, by a payment platform, updates of the first database fields in real time associated with the reference identifier to determine when one of the updates matches the at least one qualifier, wherein the one of the updates comprises a transaction completed by the consumer; and responsive to determining when the one of the updates matches the at least one qualifier, setting a semaphore that associates the selection of the one or more selectable items with the reference identifier, wherein the semaphore provides the entity to redeem the selection of the one or more selectable items, wherein the semaphore alters the pre-determined access control of the fields and is configured for monitoring, by the payment platform, customer transactions over multiple merchants with multiple issuers.

7. The non-transitory computer readable medium of claim 6, wherein generating the at least one qualifier further comprises matching a segment of the qualifier and the segment of the reference identifier.

8. The non-transitory computer readable medium of claim 7, wherein each of the item comprises a segment designation, and wherein the segment designation of the item and the segment identifier of the reference identifier correspond to a property common to a group of reference identifiers.

9. The non-transitory computer readable medium of claim 6, wherein generating the at least one qualifier further comprises selecting the at least one qualifier to have a total value less than a value of the selection of one or more of the selectable items.

10. The non-transitory computer readable medium of claim 6, further comprising storing all activity associated with the reference identifier into the second database fields that is monitored to determine when one of the updates matches the at least one qualifier.

11. A system for conditional field access comprising:
a database storing first database fields, second database fields, a first data structure, and a second data structure;
a processor configured to execute computer-executable instructions for:
populating the first database fields of a first database structure with items for storage in the database, the items being received from a plurality of data sources and corresponding to offers;

populating the second database fields with reference identifiers, each reference identifier including a location identifier and a segment identifier based on previous data stored in the first database structure pertaining to the reference identifier, wherein each reference identifier corresponds to an identification of a consumer;

creating a first item set from a union of the first and second database fields in a second data structure that match a segment identifier of a reference identifier with one of the items;

creating a second item set from a union of the first and second database fields in a third data structure that match an item location reference with a reference identifier location identifier;

performing a union operation of the first item set and the second item set resulting in selectable items being a portion of the offers stored in the second database structure, said each of the fields in the second database structure having a pre-determined access control; and a user interface receiving a selection of one or more of the selectable items from a first database record;

wherein the processor generates at least one qualifier based on the selection and a probability of interaction between the plurality of data sources and an entity associated with the reference identifier, wherein the at least one qualifier corresponds to a task to be completed by the consumer to receive the portion of the offers based on the selection;

wherein the processor monitors updates of the first database fields in real time associated with the reference identifier to determine when one of the updates matches the at least one qualifier, wherein the one of the updates comprises a transaction completed by the consumer; and responsive to determining when the one of the updates matches the at least one qualifier, wherein the processor configures a semaphore that associates the selection of the one or more selectable items with the reference identifier, wherein the semaphore provides the entity to redeem the selection of the one or more selectable items, wherein the semaphore alters the pre-determined access control of the fields and is configured for monitoring, by the processor, customer transactions across a spectrum of transactions.

12. The system of claim 11, wherein the processor matches a segment of the qualifier and the segment of the reference identifier.

13. The system of claim 12, wherein each of the item comprises a segment designation, and wherein the segment designation of the item and the segment identifier of the reference identifier correspond to a property common to a group of reference identifiers.

14. The system of claim 11, wherein the processor selects the at least one qualifier to have a total value less than a value of the selection of one or more of the selectable items.

15. The system of claim 11, wherein the processor is further configured to store all activity associated with the reference identifier into the second database fields that is monitored to determine when one of the updates matches the at least one qualifier.

* * * * *